Oct. 12, 1954    J. H. LESLIE II, ET AL    2,691,413
FUEL BURNING VEHICLE HEATING SYSTEM
Original Filed Feb. 10, 1945    3 Sheets-Sheet 1
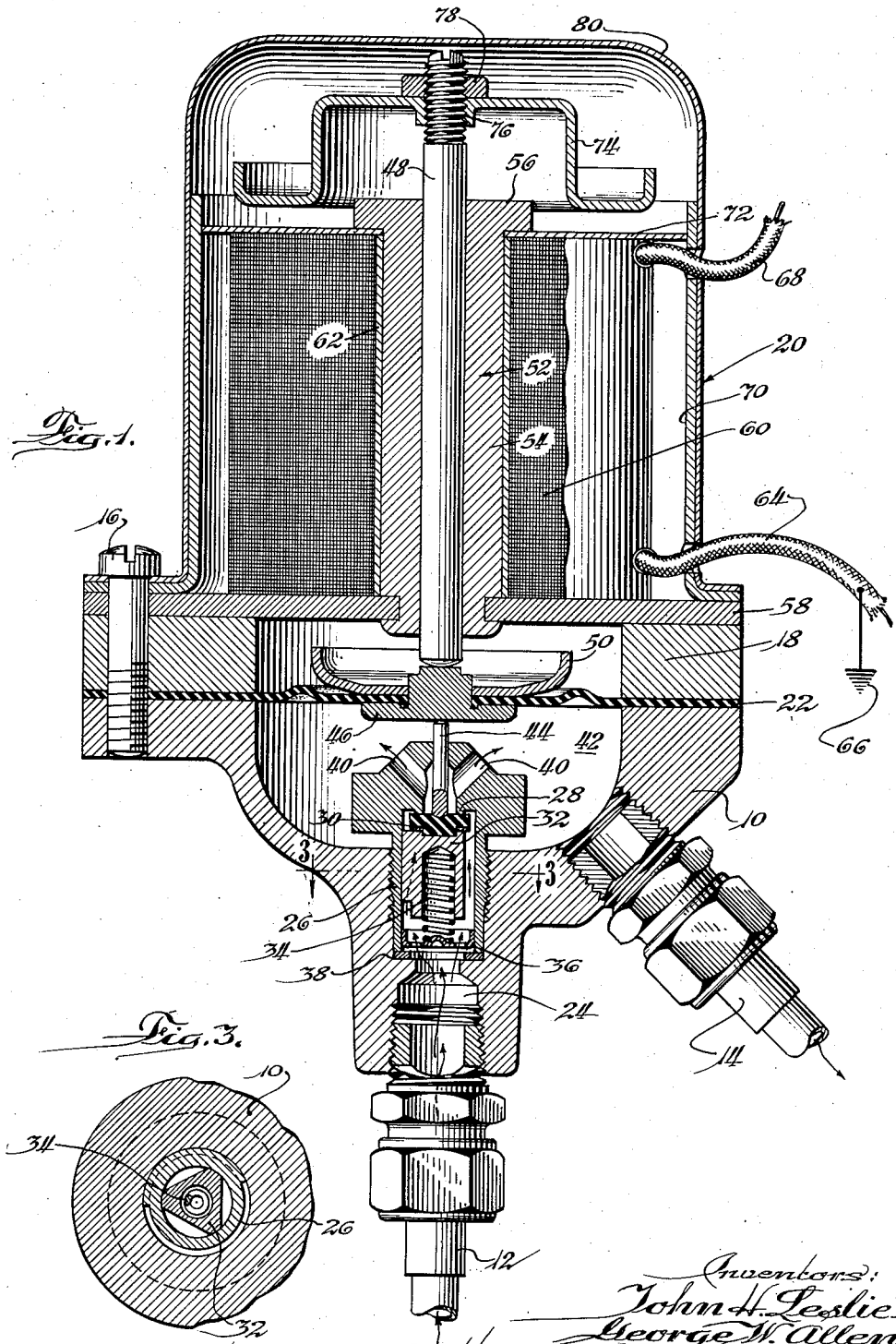

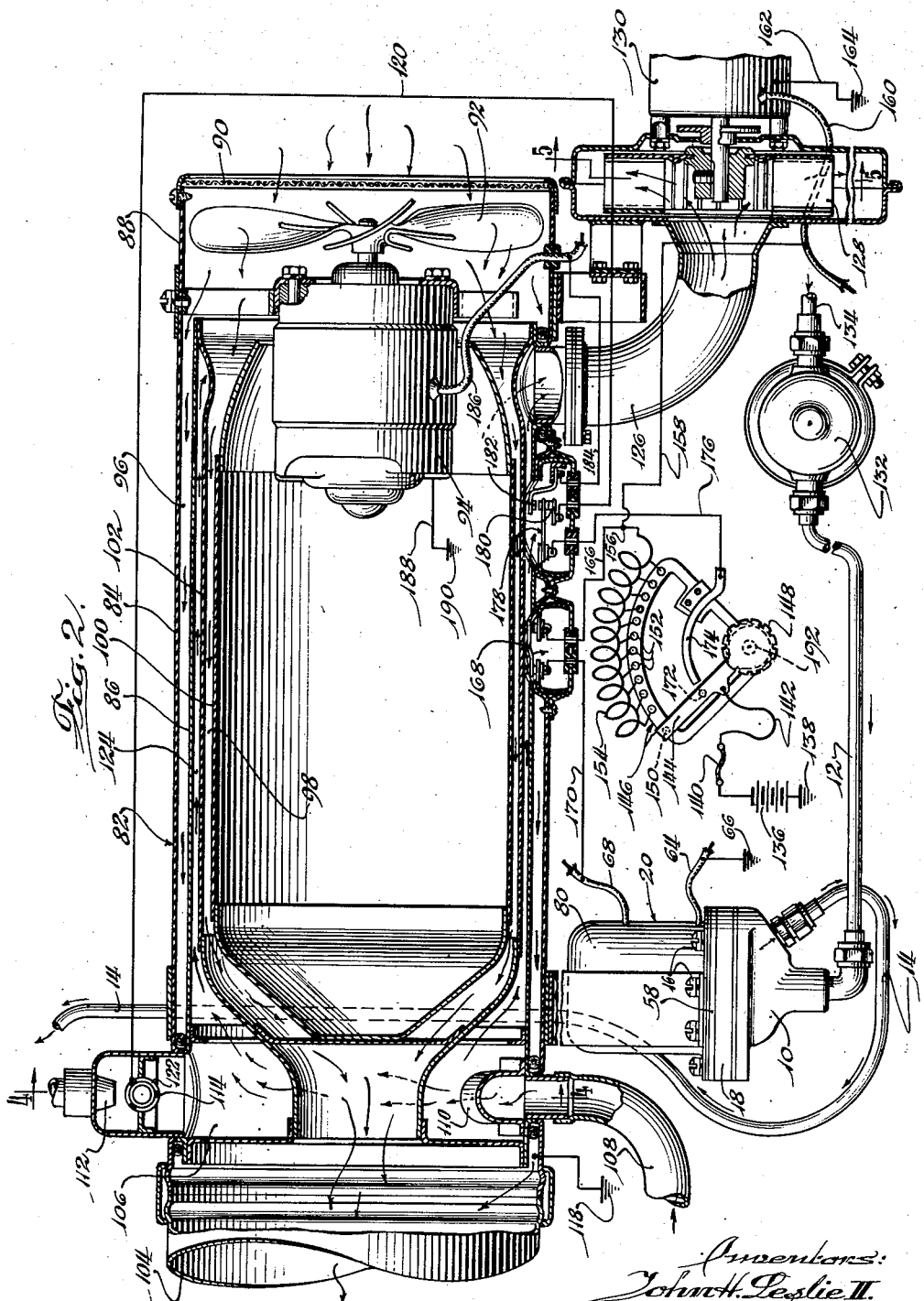

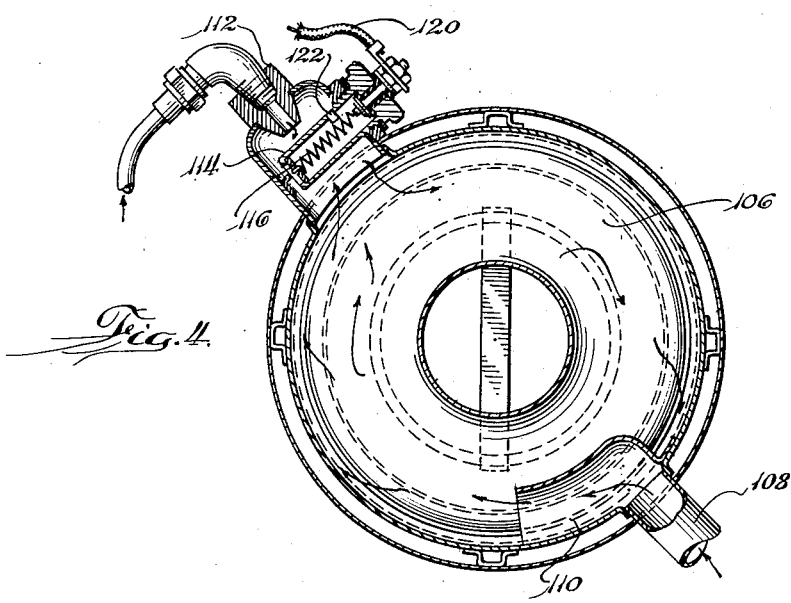
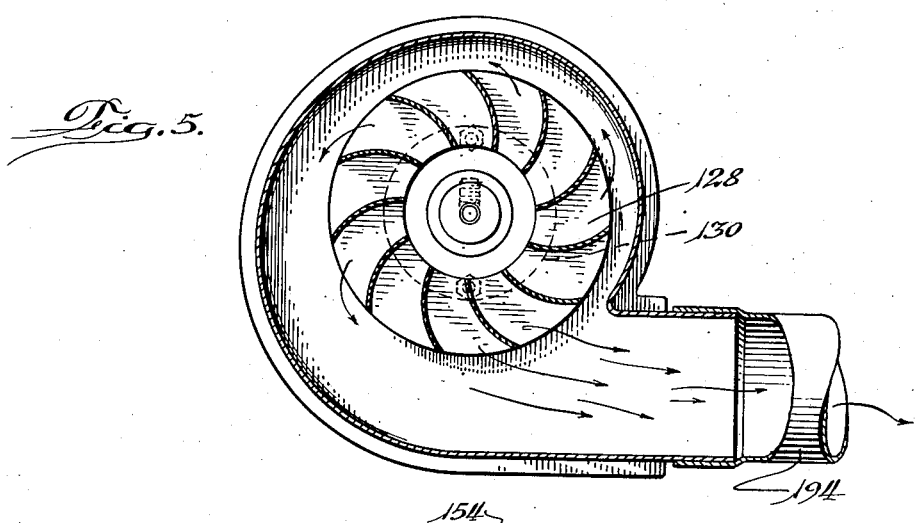
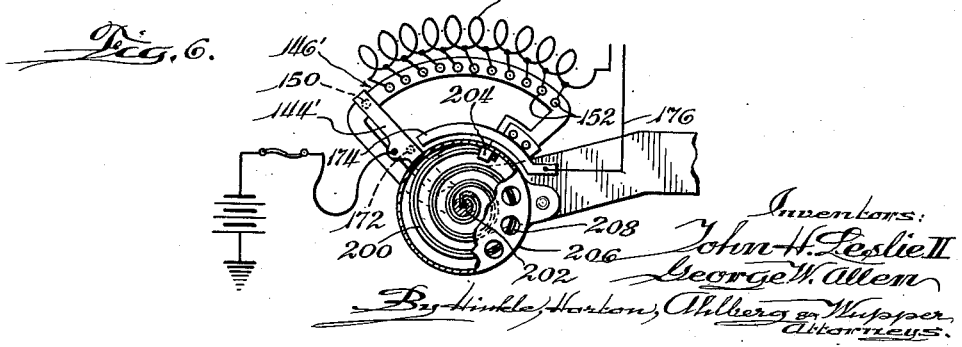

Patented Oct. 12, 1954

2,691,413

UNITED STATES PATENT OFFICE 2,691,413

FUEL BURNING VEHICLE HEATING SYSTEM

John H. Leslie II, Winnetka, Ill., and George W. Allen, Indianapolis, Ind., assignors to Stewart-Warner Corporation, Chicago, Ill., a corporation of Virginia Original application February 10, 1945, Serial No. 577,234. Divided and this application January 4, 1951, Serial No. 204,383

2 Claims. (Cl. 158—28)

This application relates to heaters for fuel burning vehicles. This application is a division of our copending application, Serial No. 577,234, filed February 10, 1945, now abandoned.

An object of this invention is to provide a heater particularly adapted for use on a vehicle which already incorporates a fuel pump or some other source of fuel pressure for feeding fuel to a fuel burning engine.

A further object is to provide a vehicle heater having a control system including a solenoid operated fuel pressure regulating valve for remotely controlling the heating output of the heater, by manually or thermostatically varying the voltage applied to the valve.

A further object is to provide such a heater in which the control system provides complete and smooth control over the fuel pressure applied to the burner of the heater.

A further object is to provide such a heater in which the fuel pressure maintained at the burner of the heater by the regulating valve is substantially unaffected by variations in the pressure developed by the fuel pressure source.

A further object is to provide such a heater in which the regulating valve changes the heat output in accordance with changes in the demand for heat caused by changes in vehicle speed, since the valve reduces the fuel pressure at the burner when the engine of the vehicle runs at low speed.

A further object of this invention is to provide a vehicle heater which is particularly economical because it operates from a fuel pressure source already existing on the vehicle.

A further object of this invention is to provide a vehicle heater having an improved system for controlling a fuel control valve, an electrical fuel igniter, a ventilating air blower, and a combustion air blower.

A still further object is to provide an improved vehicle heater having a system for simultaneously varying the flow of fuel and the flow of combustion air.

Further objects, advantages and features of this invention will be apparent from the following description of illustrative embodiments of the invention, taken in connection with the drawings, in which:

Fig. 1 is a sectional view of a pressure control valve which may form a part of a heater constructed in accordance with this invention;

Fig. 2 illustrates the complete heater, mainly in section.

Fig. 3 is a horizontal sectional view of the control valve, taken on the line 3—3 of Fig. 1;

Fig. 4 is a vertical sectional view through the combustion chamber of the heater shown in Fig. 2, and is taken on the line 4—4 of that figure;

Fig. 5 is a sectional view through the exhaust blower of the heater of Fig. 2, and is taken on the line 5—5 of that figure; and Fig. 6 illustrates an automatic thermostatic control for the heater, this automatic control being adapted to be substituted for the manual control of Fig. 2.

Referring particularly to Figs. 1 and 3, it will be seen that we have provided a pressure control valve having a base casting 10 to which a fuel supply pipe 12 and a fuel outlet pipe 14 are attached in any suitable or usual manner. The base 10 is attached by bolts 16 to a metal ring 18 and a solenoid structure indicated generally by reference character 20. A flexible diaphragm 22 is clamped between the base 10 and ring 18.

The base 10 has a passage 24 in communication with the supply pipe 12 and a nipple 26 is screwed into the upper end of this passage and provides an annular seat 28 for a valve member 30 formed of synthetic rubber or other suitable material. The valve member 30 is suitably mounted on a metallic body 32 of triangular cross-section and reciprocably mounted in the nipple 26 and urged in valve closing direction by a spring 34. The lower end of the spring rests upon a perforated sheet metal cup 36 press fitted into the lower end of the nipple 26. A gasket 38 may be clamped between the lower end of the nipple and a shoulder provided by the base 10.

The upper end of the nipple 26 is provided with diverging passageways 40 which conduct fuel flowing past the valve member 30 into a fuel chamber 42 formed between a recessed portion of the base 10 and the diaphragm 22. This fuel chamber is in direct communication with the outlet pipe 14 but communicates only with supply pipe 12 when valve member 30 is spaced to a greater or less degree from its annular seat 28. This valve member is moved away from its seat by a pin 44 reciprocably mounted in a bore in the upper end of the nipple 26. The lower end of this pin 44 directly engages the valve member 30 and the upper end of this pin engages a plate 46 having an annular flange beneath the central portion of the diaphragm 22 and a central portion extending upwardly through an opening in this diaphragm and contacting the lower end of a nonmagnetic rod 48 attached to the armature of the solenoid 20. A sheet metal cup 50 overlies the central portion of the diaphragm 22 and is press fitted to the upwardly extending central portion of the plate 46.

The solenoid may be of any suitable construction but is shown as comprising a magnetic spool, indicated generally by reference character 52, of soft iron or other suitable material. This spool includes a hub 54 having a small integral flange or head 56 at the upper end thereof and a large flange 58 swaged to the lower end thereof. An electrical coil 60 surrounds the hub 54 and is illustrated as wrapped upon a paper tube 62. The coil 60 has a lead 64 which is grounded as indicated at 66, and a second lead 68 attached to other elements of an electrical circuit as hereinafter more fully described.

The coil 60 is enclosed in a magnetic sleeve 70 of iron or other suitable material and the upper end of the coil 60 is protected by an annulus 72 of brass or other nonmagnetic material. The hub 54, flange 58 and magnetic sleeve 70 form a magnetic circuit having a gap adjacent the armature 74 which is shown as attached to the upper end of the brass rod 48 by means of threads 76 and nut 78. A cover 80 of brass, aluminum or other nonmagnetic material encloses the solenoid and this cover and the solenoid are attached to base 10 and ring 18 by bolts 16.

Referring more particularly to Fig. 2, it will be apparent that we have illustrated our novel fuel control as applied to a heater, indicated generally by reference character 82, of a type particularly adapted for use on an automobile but capable of general application. This heater comprises a tubular casing 84 enclosing a heat exchanger 86 whereby the heat of hot products of combustion is transferred to ventilating air entering the right hand or inlet end 88 of the casing 84. This end of the heater is provided with a dirt excluding screen 90 through which ventilating air is drawn by a fan 92 driven by an electric motor 94.

The ventilating air divides into two annular streams, one of which flows leftward through the annular passage 96 formed between the casing 94 and external wall of the heat exchanger 86, whereas the other stream of ventilating air flows through annular passage 98 formed between the inner and intermediate walls 100 and 102, respectively, of the heat exchanger. Both ventilating air passages 96 and 98 discharge into a ventilating air duct 104 leading to the passenger compartment of the automobile or other space to be heated.

The heater 82 is provided with an annular combustion chamber 106 to which combustion air is delivered by an inlet pipe 108 having a circumferentially directed end 110 which creates a whirling motion in the combustion chamber 106 (Fig. 4). Fuel is delivered to the combustion chamber by way of a restricted nozzle or drip plug 112 which drips fuel onto the cylindrical casing 114 surrounding the hot wire igniter 116. One terminal of the igniter 116 is in electrical communication with the heater which is grounded as indicated at 118 in Fig. 2, and the other terminal of the hot wire igniter is connected to a conductor 120 forming part of an electrical circuit, hereinafter described. The cylindrical casing 114 of the igniter has openings 122 whereby a mixture of fuel and air can come in direct contact with the hot wire igniter and be ignited thereby.

The hot products of combustion created in the combustion chamber 106 flow rightward through the passage 124, as indicated in Fig. 2, this passage being located between the ventilating air passages 96 and 98. The intervening walls of the heat exchanger are preferably thin and formed of metal affording good conductivity for the heat from the hot products of combustion to the ventilating air, so that almost all of the heat of the hot products of combustion has been given up to the ventilating air before these products enter an exhaust pipe 126 and are discharged to atmosphere through a suction fan 128 driven by an electric motor 130.

Referring to Fig. 2, it will be seen that the supply pipe 12 for the pressure control valve receives gasoline or other fuel from a pump 132 which may be the usual engine-driven fuel pump of the automobile where the heater is applied to such a vehicle. In lieu of using the usual engine-driven pump of an automobile, any other suitable pump may be utilized, such as an electrically operated fuel pump which may supply the heater alone or may supply the heater as well as other fuel consuming devices. In an automotive installation the fuel pump 132 would be connected by a pipe 134 to the main fuel tank of the automobile.

The electrical system of the heater is illustrated as being supplied with current from a battery 136 which may be the usual automobile battery or any other suitable source of current supply. One terminal of the battery is indicated as being grounded at 138 as to the automobile frame, and the other terminal is connected to a conventional fuse or circuit breaker 140 interposed in a conductor 142 leading to the movable element 144 of a combined rheostat and switch 146, which is hereinafter referred to for convenience as a rheostat. The pivoted movable element 144 of the rheostat is illustrated in Fig. 2 as being in the off or open circuit position. A knob 148 is provided on the movable element 144 and the rheostat is preferably mounted so that the knob is accessible on the automobile dash, permitting the operator of the vehicle to use the rheostat as a switch for starting and stopping the heater and also as a means for varying the rate of heat output.

The movable element or slider 144 has a contact 150 which is adapted to engage any of the contacts 152 located on an arcuate portion of the rheostat frame and connected to different portions of a resistance coil 154. The resistance coil 154 is connected to a terminal 156 in such manner that the electrical potential of this terminal varies with varying positions of the slider 144. A wire 158 connects the terminal 156 to one lead 160 of the motor 130 of the suction fan 128. The other lead 162 of this motor is grounded, as indicated at 164.

The variable potential terminal 156 is also connected by wires 166, overheat limit control 168, and wire 170 to the lead 68 of the solenoid 20 of the pressure control valve which regulates the flow of fuel to the heater. The current flow through the solenoid 20 varies with the position of slider 144 and variably controls the flow of fuel to the heater by opening to a greater or lesser extent the valve member 30. The overheat limit switch 168 is normally closed but is so designed that it automatically opens and cuts off the supply of fuel to the heater if the heater reaches a predetermined maximum temperature for which the switch is set to operate.

The rheostat slider 144 also has a second contact 172 adapted to engage a curved finger 174 connected by wire 176 to a combined igniter and fan control switch 178. When the heater is cold, the switch 178 is in the position shown and the bimetallic switch member is in engagement with a fixed contact 180 connected to igniter lead 120. After the heater has operated for a predetermined time interval, sufficient to warm up the parts to such an extent that combustion will be maintained without further energization of the igniter, the bimetallic strip moves out of engagement with contact 180 and into engagement with contact 182 connected by wire 184 to one lead 186 of the ventilating air fan motor 94. The other lead 188 of this motor is grounded as indicated at 190.

The operation of our invention is as follows: When the slider 144 of the rheostat is in the position shown, the circuits to the electrical igniter, fan motors and solenoid are open and the pressure control valve is maintained in closed position by spring 34 to cut off the supply of fuel to the heater. When the operator of the vehicle desires heat, he turns the knob 148 and swings the slider 144 in a clockwise direction around its pivot 192, thereby simultaneously causing the slider contact 150 to engage one of the rheostat contacts 152 and the slider contact 172 to engage the curved finger 174. Such movement of the slider energizes solenoid 20, whereby armature 74 is drawn downwardly into the gap between the upper end of sleeve 70 and head 56 and such movement opens the valve member 30 to an extent determined by the position of the slider relative to the resistance 154. Opening of the valve member 30 permits fuel to flow to the drip plug 112 and drip onto the cylindrical casing 114 surrounding the igniter 116. The igniter being energized by engagement of slider contact 172 with curved finger 174, heats up and ignites the fuel. Engagement of contact 150 with one of the contacts 152 also energized the motor 130 of the exhaust fan 128 and started this fan in operation.

This exhaust fan draws combustion air into the combustion chamber 106 by way of combustion air inlet 108 and also causes the hot products of combustion to flow from the combustion chamber 106 through annular passage 124 and pipe 126 into the exhaust fan casing from which they are discharged to atmosphere through an exhaust pipe 194.

After the heater has operated a short time, it attains normal operating temperature and thereafter will continue to support combustion without assistance from the igniter 116. When this temperature is attained, the bimetallic element of the switch 178 moves away from fixed contact 180 and into engagement with fixed contact 182. This breaks the igniter circuit and energizes the motor 94 of the ventilating air fan 92. This fan thereupon starts to operate and draws air through the screen 90 and forces this air through annular passages 96 and 98 and thence into duct 104 leading to the passenger compartment of the automobile or other space to be heated. As the ventilating air travels through the heater, it absorbs heat given up by the combustion gases and is delivered to the passenger space at a temperature substantially above that of the air entering the heater through the screen 90. The fan motor 94 and igniter 116 are not connected through the variable resistance 154 and therefore do not operate variably in response to different positions of the slider 144, except that this slider acts as an off and on switch controlling the circuit of the igniter and motor 94.

The solenoid-operated valve device serves as an automatic pressure regulator for the fuel furnished to the burner by compensating for variations in the pressure of the fuel fed by the pump 132. This result is attained because the fuel pressure in the chamber 42 operating against the lower surface of the diaphragm 22 is yieldingly balanced by the force of the solenoid 20. Any rise in this pressure below the diaphragm, tending to lift it, will permit the spring 34 and the pressure of the fuel to shift the valve 30 toward closed position, reducing the flow and immediately causing a drop in pressure in the chamber 42, as the fuel continues to leave the chamber through the pipe 14 leading to the heater. Then the diaphragm will move downward under the force of the solenoid, increasing the valve opening sufficiently to maintain a substantially constant pressure on the fuel flowing to the heater.

Thus, for any certain voltage in the solenoid coil 60 there is a certain downward force exerted against the diaphragm 22, which is balanced by a certain fuel pressure. If this voltage is increased, a greater fuel pressure in chamber 42 will be required to maintain a balanced condition of the valve and this will result in a higher pressure at the heater. Conversely, when the voltage is reduced, the fuel pressure at the heater is lowered.

Ordinarily the voltage supplied to the solenoid and exhaust blower 130 is varied by adjustment of the rheostat arm 144, and this will operate to vary proportionately the rate of fuel and combustion air supply and therefore heater operation to give any desired heat output. If a given adjustment does not produce a comfortably high temperature the operator will simply advance the arm 144 one or two steps, or if the temperature seems too high he will move the arm back to a position corresponding to some lower voltage. In the electrical circuit of an automobile the voltage varies with different conditions of operation, but such variation in voltage can be compensated by shifting of the rheostat arm 144 to increase or reduce the resistance in the circuit of the solenoid coil 60 and fan motor 130 so as to offset either a reduction or an increase in the voltage of the automobile electrical circuit.

In some instances a reduction of voltage may be coincident with a reduced demand for heat. For example, when an automobile is halted in traffic or is parked at the curb with the engine idling the voltage supplied by its electrical system may drop considerably, but while the vehicle is standing, the heat loss to the adjacent air is usually less than when it is moving, and the lower demand on the heater will correspond approximately to the reduced voltage available.

The overheat switch 168 is an emergency switch which may never operate during the normal life of the heater. In case circulation of ventilating air should be materially restricted or completely cut off as by a failure of fan motor 94 or clogging up of screen 90, the heater would attain a temperature sufficiently high to cause the overheat switch 168 to open the circuit of solenoid 20 and thereby cut off the supply of fuel to the heater.

In lieu of manual operation of the heater, as contemplated in the form of our invention shown in Figs. 1 to 5, inclusive, automatic operation may be utilized, if desired. In Fig. 6 we have indicated a thermostatic control which can be used to replace the manual control of the rheostat slider so that the heater will automatically go on when the temperature in the passenger compartment or other space to be heated falls below a predetermined minimum. Similarly, the heater will automatically cut out when the temperature in such space reaches a predetermined maximum and between these limits the automatic control can vary the heat output of the heater to give a substantially uniform rate of operation provided any of the gradations in rate of operation provided by the rheostat substantially balance the loss of heat from such space.

In this embodiment of our invention, the rheostat 146' has a pivoted slider 144' which is moved about its pivot by a spirally arranged bimetallic strip 200. The inner end 202 of the bimetallic strip is attached to the operating shaft for the slider 144' and the outer end of this bimetallic strip is attached at 204 to an enclosing and protective casing 206. The casing 206 is preferably provided with holes 208 or other openings whereby air in the space to be heated has free access to the bimetallic strip so that the temperature of this strip will always correspond accurately to the temperature of the space being heated.

The thermostatic control of Fig. 6 is connected with the rest of the mechanism only by electrical conductors so that this thermostatic control can easily be located at any desired position in the passenger compartment of the automobile or in any other space to be heated. It will be understood that the casing 206 may be given any pleasing conformation and attractive finish so that the location of this control in the passenger compartment or other space will not be objectionable from an aesthetic standpoint.

While we have shown and described preferred embodiments of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. A heating system for operation in conjunction with an automobile or the like which has a source of liquid fuel at low but positive pressure suitable for supplying the automobile engine carburetor, said heating system having a fuel burner of the low pressure type adapted for operation on fuel supplied directly thereto at low but positive pressure within the pressure range at and below that available from said source, means including an electric motor driven fan for supplying combustion air to said burner at a rate depending upon the voltage impressed upon said motor, an automatic pressure regulator having inlet and outlet connections and comprised of a housing and a diaphragm forming with the walls of the housing a closed chamber, an inlet valve for said chamber and linkage means between said diaphragm and said valve to tend to close said valve as the pressure in said chamber rises, means adapted for connecting said regulator inlet to said source, means connecting said outlet connection to said burner to regulate the fuel pressure at said burner, electrically energized means for loading said diaphragm in opposition to the pressure in said chamber to shift the outlet pressure range of operation of said regulator upwardly as the voltage impressed on said electrically energized means is increased, spring means opposing said electrically energized means for closing said valve for interrupting flow through said regulator when the last said voltage falls below a certain minimum, single electric circuit means for energizing both said electrically energized means and said electric motor, and means for regulating the voltage of said circuit for regulating the heat output of the system.

2. A heating system for operation in conjunction with an automobile or the like which has a source of liquid fuel at low but positive pressure suitable for supplying the automobile engine carburetor, said heating system having a fuel burner of the low pressure type adapted for operation on fuel supplied directly thereto at low but positive pressure within the pressure range at and below that available from said source, means including an electric motor driven fan for supplying combustion air to said burner at a rate depending upon the voltage impressed upon said motor, an automatic pressure regulator having inlet and outlet connections and comprised of a housing and a diaphragm forming with the walls of the housing a closed chamber, an inlet valve for said chamber, and linkage means between said diaphragm and said valve to tend to close said valve as the pressure in said chamber rises, means adapted for connecting said regulator inlet connection to said source, means connecting said outlet connection to said burner to regulate the fuel pressure at said burner, electrically energized means for loading said diaphragm in opposition to the pressure in said chamber to shift the outlet pressure range of operation of said regulator upwardly as the voltage impressed on said electrically energized means is increased, spring means opposing said electrically energized means for closing said valve for interrupting flow through said regulator when the last said voltage falls below a certain minimum, single electric circuit means for energizing both said electrically energized means and said electric motor, variable resistor means for regulating the voltage in said circuit for regulating the heat output of the system, and switch means for opening said circuit to deenergize said motor to interrupt the flow of combustion air to said burner and to deenergize said electrically energized means to allow said spring to close said valve to interrupt the flow of fuel to said burner.

References Cited in the file of this patent

UNITED STATES PATENTS

| Number | Name | Date |
| --- | --- | --- |
| 1,359,042 | Doble | Nov. 16, 1920 |
| 2,308,888 | McCollum | Jan. 19, 1943 |
| 2,451,459 | Williams | Oct. 19, 1948 |